US005536571A

United States Patent [19]
Pearson et al.

[11] Patent Number: 5,536,571
[45] Date of Patent: Jul. 16, 1996

[54] RELEASE COATING

[75] Inventors: John D. Pearson, Hamilton Square; Salvatore Diodati, Yardville, both of N.J.

[73] Assignee: Congoleum Corporation, Trenton, N.J.

[21] Appl. No.: 87,598

[22] Filed: Jul. 2, 1993

[51] Int. Cl.$^6$ ..................................................... B32B 7/06
[52] U.S. Cl. ........................ 428/341; 428/195; 428/201; 428/206; 428/340; 428/411.1; 428/454; 428/500; 428/515
[58] Field of Search ............................. 428/40, 352, 353, 428/354, 480, 141, 172, 219, 195, 201, 206, 340, 341, 500, 515, 411.1, 454; 525/56

[56] References Cited

U.S. PATENT DOCUMENTS

| | | | |
|---|---|---|---|
| 2,702,285 | 2/1955 | Bebb et al. | 260/29.7 |
| 2,746,893 | 5/1956 | Matthes | 154/46.8 |
| 2,913,773 | 11/1959 | Hassel | 18/59.2 |
| 3,115,386 | 12/1963 | Zentmyer | 18/59 |
| 3,632,386 | 1/1972 | Hurst | 117/46 FC |
| 3,941,610 | 3/1976 | Maskal et al. | 106/308 |
| 3,946,135 | 3/1976 | Peterson | 428/411 |
| 3,985,937 | 10/1976 | Fife | 428/486 |
| 4,118,541 | 10/1978 | Power et al. | 186/71 |
| 4,159,219 | 6/1979 | Evans | 156/71 |
| 4,160,798 | 7/1979 | Price et al. | 264/213 |
| 4,234,649 | 11/1980 | Ward | 428/285 |
| 4,282,054 | 8/1981 | Mattor et al. | 156/289 |
| 4,304,815 | 12/1981 | Cugasi, Jr. | 428/280 |
| 4,373,992 | 2/1983 | Bondoc | 162/145 |
| 4,409,359 | 10/1983 | Tanimura et al. | 524/575 |
| 4,423,100 | 12/1983 | Witman | 428/42 |
| 4,598,105 | 7/1986 | Weber et al. | 523/215 |
| 5,034,448 | 7/1991 | Koblinski et al. | 529/447 |
| 5,165,976 | 11/1992 | Newing et al. | 428/40 |
| 5,254,661 | 10/1993 | Wilson | 428/57 |
| 5,284,690 | 2/1994 | Williams et al. | 428/40 |

Primary Examiner—Patrick J. Ryan
Assistant Examiner—William A. Krynski
Attorney, Agent, or Firm—Synnestvedt & Lechner

[57] ABSTRACT

A multi-ply structure which includes a release coating sandwiched between two plies of the structure and present in an amount of about 5 to about 25 g/sq yd., one of the plies of the structure being flexible and in contact with the release coating and removable therefrom by the application of a force of between about 90 to about 600 g/in., as determined by the Keil test procedure, including a composition for forming the release coating and comprising an aqueous coating composition which includes a solids portion and which is effective in formig a coating having release properties, the solids portion of the comosition comprising a major amount of resin binder and a minor amount of filler, the filler comprising a major amount of clay and a minor amount of magnesium or calcium hydroxide, and including also a continuous process for forming such multi-ply structure, including particularly a structure comprising a poly(vinyl chloride) ply strippable from a support ply.

20 Claims, No Drawings

RELEASE COATING

FIELD OF THE INVENTION

This invention relates to an improved release coating. More particularly, this invention relates to an aqueous, resin-based coating composition which is capable of forming a release coating and to a multi-ply structure which includes the release coating sandwiched between plies of the structure.

The present invention is described initially in connection with the manufacture of sheeting comprising poly(vinyl chloride), hereafter also referred to as "PVC". However, it should be understood that the present invention can be used in other applications, as described below.

It is known to prepare PVC sheeting which is flexible in nature and which can be designed for use in various types of applications, including, for example, floor covering, wall covering, and decorative and/or functional coverings for a variety of articles such as vehicle dashboards, interior roofing for vehicles, and vehicle trunk interiors.

An industrial method which is used to prepare such sheeting involves applying a plastisol (solid resin particles of PVC dispersed in a liquid plasticizer) to a support sheet. The typical industrial process is continuous in that the plastisol is fed continuously to the support sheet which is carried on rollers that travel at a fairly high speed, for example, about 70 to about 150 feet per minute. After deposition on the support, the plastisol is fused as it is exposed to elevated temperatures, for example, about 350° to about 450° F. to form a multi-ply structure.

The aforementioned type of process can be modified in various ways to provide PVC sheeting that is suitable for use in a particular application. For example, the plastisol can include a foaming or blowing agent, the surface of the PVC composition can be printed to impart decorative effects thereto, and other layers, for example, a top coat finish can be applied to the surface of the PVC composition.

A necessary step in a production process of the type described above consists of the stripping of the PVC ply from its underlying support ply. The nature of PVC and the material comprising the support ply is such that the former adheres so tightly to the other that the PVC ply cannot be removed in tact from the support. In effect, the adherent forces between the PVC and the support plies are greater than the cohesive force of the PVC ply.

To provide a multi-ply structure in which the PVC ply is readily strippable from the underlying support, a release coating is formed on the support sheet prior to depositing thereon the material which forms the PVC ply. The release coating is formed from a liquid composition which forms a film of solids on the support sheet as the liquid portion of the composition evaporates. The nature of the release coating is such that it permits the PVC ply to be stripped readily from the ply comprising the support.

For ideal industrial use, it is desirable that the release coating and the composition from which it is formed have a variety of properties. For example, the nature of the release coating should be such that the PVC ply is strippable from the support ply with the exertion of a relatively small amount of force that can be applied initially by hand and then by mechanical apparatus. Also, the release coating should not in any way affect adversely the PVC sheeting, including, for example, by the adherence thereto of pieces or bits of coating which are aesthetically unattractive. In addition, it is desirable for the release coating to be effective even when used in relatively small amounts. Furthermore, the release coating should not degrade under the conditions of the manufacturing process, for example, the heating conditions used to fuse the plastisol. The composition from which the release coating is formed should be water-based (not organic-based) for environmental considerations. It is preferred that the nature of the solids portion of the liquid coating composition be such that they can be dispersed readily in the liquid phase of the composition and that the composition be stable and have a relatively long shelf life. Furthermore, it is preferred that the coating composition be capable of being applied at room temperature and in a manner such that a sufficient amount of coating is deposited on the surface of the support sheet by conventional coating apparatus and in a one-pass operation.

It will be appreciated from the discussion below that the use of prior art release coatings and compositions used to form them have one or more disadvantages. This applies even to coating compositions and release coatings which are used currently in industry.

Accordingly, the present invention relates to an improved composition and release coating which is formed therefrom and which can be used in the manufacture of vinyl sheeting, as well as in the manufacture of other multi-ply products.

REPORTED DEVELOPMENTS

The following patents disclose the use of a release coating in the manufacture of PVC sheeting. U.S. Pat. No. 3,115,386 discloses a release coating comprising a film of a complex compound of the Werner type in which a trivalent nuclear chromium atom is coordinated with an acrylic carboxylic acidic group which contains at least ten carbon atoms. U.S. Pat. Nos. 2,913,773 and 4,159,219 disclose the formation of a release coating from an aqueous coating composition which includes methyl cellulose. U.S. Pat. No. 4,304,815, assigned to the same assignee as the present invention, discloses the formation of a release coating from an aqueous composition comprising poly(vinyl alcohol), clay, and an adhesive binder, for example, poly(vinyl acetate) homopolymers and copolymers. U.S. Pat. No. 4,423,100 discloses the formation of a release coating from an organic-based coating composition comprising a cellulosic ester or cellulosic ether in combination with adhesion-promoting compounds having an affinity for vinyl chloride-containing compositions. Examples of the adhesion-promoting compound include poly(methyl methacrylate), copolymers of methyl methacrylate and butyl methacrylate, arylsulfonamideformaldehyde condensates, ortho- and para-toluenesulfonamides, plasticizers such as dicyclohexyl and diphenyl phthalate, polyester resins, maleic acid resins, polyamide resins.

Although use of compositions of the type described in the aforementioned patents and coatings formed therefrom offer certain advantages, there are disadvantages also associated with their use. For example, the release coating described in the '100 patent is formed from a composition that comprises a relatively large amount of hydrocarbon solvent. This is environmentally unacceptable. The use of the release coating described in the '386 patent is problematical because of the use of chromium which is environmentally undesirable. Problems associated with the coating composition or coating described in the '219 patent stem from the relatively high proportion of water present in the composition. This leads to relatively high drying costs. Problems encountered in the use of the coating composition or coating of the '815 patent include an excessively slow speed (80–130 feet per minute) to dry or the use of two applications to obtain target release values and also a mix procedure requiring elevated temperature to solubilize binders.

The prior art discloses numerous other types of release coatings. Examples are disclosed in the following U.S. Pat. Nos: 2,746,893; 4,118,541; 4,282,054; and 4,234,649. The disclosures of these patents do not refer to the use of the release coatings in the manufacture of PVC products. Various disadvantages associated with the use of the compositions and release coatings described in these patents relate to instability during storage, environmental problems and the need to use special processing techniques in formulating and/or applying the coating composition and drying the same.

The present invention provides improved water-based, resin-containing compositions which can be used to form improved release coatings that have a combination of properties which make them suitable for use in the manufacture of PVC sheeting and in other applications which involve the manufacture of an article by a process which includes the formation of a multi-ply structure having a ply which is readily removable therefrom.

SUMMARY OF THE INVENTION

In accordance with the present invention, there is provided a multi-ply structure which includes a release coating sandwiched between two plies of the structure and present in an amount of about 5 to about 25 grams/square yard, preferably about 10 to about 20 g/sq yd., one of the plies of the structure being flexible and in contact with the release coating and removable therefrom by the application of a force of between about 90 to about 600 grams/inch, as determined by the Keil test procedure (described hereinbelow).

It is believed that the present invention will be used widely in connection with multi-ply structures in which the flexible removable ply comprises poly(vinyl chloride).

Another aspect of the present invention is the provision of an aqueous coating composition which includes a solids portion and which is effective in forming a coating having adhesive properties, the solids portion of the composition comprising a major amount of resin binder, preferably styrene-butadiene resin, and a minor amount of filler, the filler comprising a major amount of clay and a minor amount of magnesium or calcium hydroxide, the former being preferred.

In preferred form, the composition of the present invention comprises: (A) about 25 to about 40 wt. % of binder resin; (B) about 10 to about 20 wt. % of clay; (C) about 3 to about 12 wt. % of magnesium or calcium hydroxide; and (D) about 35 to about 57 wt. % of water.

Still another aspect of the present invention is the provision of a continuous process in which: a liquid coating composition capable of forming a release coating is applied to a support surface moving at the rate of at least about 180 ft. per minute, the amount of the liquid coating composition being such that the amount of release coating formed on the surface in dry form is about 5 to about 25 g/sq yd.; thereafter applying to the thus coated support poly(vinyl chloride) in the form of a plastisol; and thereafter fusing the plastisol to provide a multi-ply structure which includes a PVC ply; wherein the PVC ply is capable of being removed readily from the structure by the application of a force of between about 90 to about 600 g/in., as determined by the Keil test procedure.

The present invention provides the user with numerous advantages relative to use of other release coatings. The ingredients comprising the release coating of the present invention are relatively inexpensive and the coating is effective, even when used in small amounts, and is stable under the conditions of manufacture. The coating composition from which the release coating is made is water-based and can be applied effectively at ambient temperature. The composition is stable and has good shelf life properties. In addition, the coating composition can be prepared readily at ambient conditions without the need to use special preconditioning or process steps, for example, the use of elevated temperature to solubilize one or more of the constituents for component solubility are not required.

DETAILED DESCRIPTION OF THE INVENTION

The ingredients comprising the coating composition of the present invention include particulate solids of a resin binder, and, in the form of particulate solids, the fillers clay and magnesium or calcium hydroxide. These solids are dispersed in the aqueous phase of the composition.

The resin solids function as a binder to form a coating which has release properties as a film of the wet coating composition dries. Any suitable resin binder can be used, preferably in the form of a latex. Typically, the resin will have a glass transition temperature of about −25° C. to about 45° C. Examples of resins that can be used are acrylic resins, methacrylic resins and methyl cellulose. Styrene-butadiene resin is a preferred resin for use in the practice of the present invention.

Styrene-butadiene resin (also referred to herein as "SBR") is a well-known material which is available commercially. Most preferably, the styrene-butadiene resin is in carboxylated form. This is also a well known material which is available commercially. The use of SBR in adhesives and other applications where it functions as a binder has long been known. For example, see U.S. Pat. Nos.: 2,702,285; 3,985,937; 4,373,992; 4,409,359; 4,598,105; and 5,034,448. However, it is believed that the coating composition of the present invention and the release coatings formed therefrom are unique applications for SBR. It is believed that the SBR that will be used most widely in the practice of the present invention will comprise about 40 to about 80 wt. % styrene, with the balance of the co-polymer comprising principally butadiene.

It is preferred that the SBR (including SBR in carboxylated form) be provided in the form of a latex which comprises solid particles of SBR dispersed in water. Latexes of SBR are available commercially and generally comprise about 50 wt. % of the resin solids. An SBR latex is typically made by an emulsion-polymerization in which the monomers are polymerized in an aqueous medium which may or may not include a dispersing agent.

The amount of resin binder comprising the coating should be sufficient to form a film in which the solids are bound together in a manner such that the integrity of the film is retained under the condition of use. For this purpose, the major portion of the coating should comprise the resin binder.

Any clay that functions to lower the adhesive strength of the coating and that is capable of being suitably dispersed in the aqueous composition can be used. A preferred clay is a kaolin clay, with excellent results having been achieved by the use of waterwashed kaolin clay, a well known material which is available commercially.

The clay constituent has a particle size which permits it to be uniformly dispersed and applied without streaking, for example, a particle size of about 0.3 to about 5. microns. The clay should comprise the major constituent of the filler portion of the coating.

The magnesium or calcium hydroxide constituent functions to further lower the adhesive strength of the coating and provide shelf life stability. For this purpose, the magnesium or calcium hydroxide should comprise the minor constituent of the filler portion of the coating. A mixture of the hydroxides can be used. Magnesium hydroxide is preferred because of better color and shelf-life stability.

The magnesium or calcium hydroxide has a particle size which permits it to be uniformly dispersed without special processing techniques. It is preferred that the particle size of the hydroxide be not greater than about 40 microns.

The relative amounts of the clay and magnesium or calcium hydroxide have an effect on the release characteristics of the coating. For example, the higher the amount of clay relative to the hydroxide, the higher the adhesive strength of the coating. It is preferred that the weight ratio of the clay to the hydroxide be at least about 1.5 to 1 more preferably about 2:1 to about 2.5:1, and most preferably about 2.1 to about 2.3:1.

The water constituent of the coating composition functions as a carrier in which the particulate solids are dispersed and in which optional ingredients (described below) are dissolved or dispersed. The proportion of water comprising the composition will generally be at least that amount which is needed to perform its dispersing/solubilizing function and an amount which enables the composition to be applied conveniently to the surface.

Additives can be included in the coating composition to achieve desired effects. This is a practice which is well known in the art. Examples of such additives include defoamers, anti-oxidants, optical brighteners, biocides, thickeners, and processing aids which function to reduce frothing in the coating, to provide heat stability, to provide visual aid for evaluating coating uniformity, to reduce volatility. The additive is included in the coating composition in an amount which is functionally effective, as recognized in the art. Typically, the amount of a particular additive will be no greater than about 1 wt. % of the composition. More typically, it will comprise a fraction of a percent, with the total amount of additives being about 1 to 5 wt. % of the composition.

The pH of the composition should be such that the SB resin solids remain dispersed in the composition. For this purpose, it is recommended that the pH be greater than about 4. Preferably the pH is about 7 to about 10.

The viscosity of the composition should be such that the composition will flow readily and wet the surface of the support sheet uniformly. The viscosity will vary, depending on the type of applicator that is used to apply the coating composition. For use with a rod coater, it is recommended that the viscosity be about 50 to about 100 cp, measured at 78° F.

In preferred form, the composition of the present invention comprises: (A) about 25 to about 40 wt. % of binder resin; (B) about 10 to about 20 wt. % of clay; (C) about 3 to about 12 wt. % of magnesium or calcium hydroxide; and (D) about 35 to about 57 wt. % of water. In particularly preferred form, the coating composition comprises: (A) about 30 to about 35 wt. % of binder resin; (B) about 12 to about 16 wt. % of clay; (C) about 5 to about 8 wt. % of magnesium or calcium hydroxide; and (D) about 40 to about 55 wt. % of water. Preferred weight ratios of clay to hydroxide have been described above.

A support surface comprising felt is used widely in the manufacturing of PVC sheeting. The release coating of the present invention works well on such felt supports, for example, felts of cellulosic, or other natural, synthetic, or man-made fibers and/or filaments. The release coating of the present invention can be formed also on other materials, including, for example, paper and paper-based products, such as kraft paper, crepe paper, glassine, particle board, chip board, card board, paper board, pressed fiber board, etc.; natural or synthetic rubber or elastomers; fibrous webs, cloth, nonwoven fabrics, woven, knitted or otherwise fabricated materials; metal sheets, strips or foils; leather and leather-like products; plastic films, strips and sheets; wood, plywood and wood veneer. A preferred support surface is a fibrous-reinforced sheet highly filled with calcium carbonate, talc, or clay. The support surface can be, for example, in continuous form or in the form of a patch or strip.

As mentioned above, the invention has particular applicability to the formation of a multi-ply structure which includes a PVC ply adhered to a support sheet, for example, of the type described immediately above. It should be understood that other materials can be adhered to the release coating in the multi-ply structure. Examples of such materials are sheets made from other resins, woven or nonwoven fabrics made from synthetic or natural fibers and various of the materials mentioned above in connection with the support surface.

The aqueous release coating composition may be applied to the support surface by any suitable coating process, including brush, roller, pad, knife, extrusion, dip, curtain, spray, or other coating process. Good results have been achieved by use of a rod coater.

One of the major advantages of the present invention is that the release coating is effective even when used in relatively small amounts. By way of background, it is noted that the presence of a relatively small amount of a conventional release coating typically leads to a situation in which an undesirable excessive amount of force must be used to remove the strippable ply from the multi-ply structure. As the amount of coating is reduced, the force needed for separation becomes greater and greater, for example, to the extent that the force approaches that amount that is required to separate the plies in a situation where no release coating is used. As described in more detail below, the multi-ply structure of the present invention is such that the presence of a relatively small amount of release coating permits one, nevertheless, to use a relatively small amount of force in separating one ply from the other.

The force used to separate one ply from the other is defined herein in terms of grams per inch (g/in.) as measured by the Keil test procedure. This procedure involves the use of an apparatus named the Keil Tester, Model #2 (Serial #2538), manufactured by Dow Corning, Midland, Mich., U.S.A. The apparatus is used with one of two scales, namely Ohaus Scale Model #8012 (range –0 to 500 g) and Ohaus Scale Model #8014 (range –0 to 2000 g), manufactured by Ohaus Scale Corp. Union, N.J., U.S.A. The multi-ply structure is made or cut into test samples of 1"×6" strips. The flexible ply is separated by hand from the support ply approximately ½" from one end of the strip. The stripped end of the support ply is placed into the fixed clamp of the tester. The peeled end of the flexible ply is attached to the clip of the tester, the clip in turn being attached to the bottom portion of the scale of the tester. The scale is set at zero at the beginning of the test. Both 6" strips should be centered and vertical in reference to the tester. As the motor of the apparatus is turned on, the strip of the flexible ply is peeled away from the strip of the support ply. The force needed to do this is recorded on the scale in grams per inch. The average value observed between the two black lines which appear on the tester's face is recorded. These lines are approximately 1¼ to 3¼ inch up from the clamp. If the reading exceeds 500 g, the scale should be switched to the 0 to 2000 grams scale. Preferably, the average of the evaluation of four samples of the test specimen is reported.

Speaking generally, the greater the amount of release coating present between the plies, the smaller the amount of force needed to separate the plies. And, the smaller amount of coating present between the plies, the greater amount of force needed to separate the plies. The maximum amount of coating present should generally be such that the force needed to separate the plies is at least about 90 g/in. If the force needed to separate is less, there is a risk of premature delamination of the plies as a result of the presence of sheer forces which are developed during the manufacturing process of the multi-ply structure. Preferably, the amount of coating used should be such that the force needed to separate the plies is at least about 110 g/in.

The minimum amount of coating should be such that the amount of force needed to separate the plies is not greater than about 600 g/in. In considering the maximum amount of force used in stripping the plies, there needs to be taken into consideration the adhesive strength of the release coating to the support sheet and the cohesive strength of each of the support sheet and overlying sheet. Clearly, the force needed to separate one ply from the other must be less than the amount of force that would be required to break the internal bonds which hold together either the support sheet or the overlying sheet. A preferred force is about 250 to about 500 g/in.

Taking the above into account, it is recommended that the amount of coating composition applied to the support sheet be such that the amount of release coating formed thereon be about 5 to about 25 g/sq yd. Preferably, the amount of coating deposited on the support sheet should be about 10 to about 20 per sq yd. (These amounts refer to the coating in dry form.)

The thickness of release coatings present in amounts as described above will generally be not greater than about 1 mil, for example, about 0.3 to about 0.7 mil. To achieve such thicknesses, the thickness of the wet coating composition will generally be about 0.6 to about 1.5 mils. The release coating composition is preferably applied to the substrate in a single coating process. However, in certain circumstances wherein a thicker coating is required, then the release coating composition may be applied to the substrate in two or more coating steps.

The example below is illustrative of the present invention.

EXAMPLE

The following coating composition within the scope of the present invention is prepared.

| Ingredients | wt. % |
|---|---|
| styrene-butadiene resin[1] | 30.8 |
| clay | 13.6 |
| magnesium hydroxide | 6.3 |
| water[2] | 49.3 |

[1]supplied as a latex (sold by the Dow Chemical Company as RAP-344) having a resin solids content of 49.6 wt. %
[2]includes water of the latex and added water The styrene-butadiene resin used in the composition of Example 1 is a carboxylated form thereof. The clay constituent of the above composition is a waterwashed kaolin clay. Calculations show that the weight ratio of clay to magnesium hydroxide in the above composition is 2.16 to 1. The composition has a viscosity of about 50 to about 100 cp at 78° F. and a pH of about 9.

The coating composition is stirred to disperse uniformly the solids as it is applied by an applicator roll to the surface of a felt comprising calcium carbonate filler, cellulosic and glass fibers, latex binder (styrene-butadiene resin) and other materials. Excess coating composition is wiped off the surface of the felt by a rod coater. The felt is drawn through a dryer section travelling at the rate of about 190 ft. per minute. The thickness of the felt is about 0.025 inch. The coating composition is applied in an amount of about 27 g/sq.yd of felt. It dries to form a coating weighing about 14 g/sq yd. The coated felt can be processed immediately or stored for weeks or even months.

After the formation of the release coating on the felt, there is applied to the coated felt a PVC composition which comprises PVC resin, plasticizer, filler, and additives. The PVC composition is applied to the coated felt in an amount of about 0.5 lb. per sq yd. and is pulled through an oven having a temperature of about 350° F. at a speed of about 125 ft. per minute. The thickness of the PVC composition applied to the coated felt is about 8 mils. Thereafter, the multi-ply structure comprising the release coating sandwiched between the felt ply and ply of PVC composition is coated with an additional layer of plastisol, heated to gel the plastisol, rotogravure printed and then fused to yield the end product. The PVC ply is stripped readily from the felt by mechanical means. A test sample of the product is subjected to the Keil test procedure. A force of about 325 grams/inch is recorded.

It should be appreciated that the present invention provides improved practical and economic means for fabricating a multi-ply structure of the type in which it is desired to remove one of the plies from the structure.

What is claimed is:

1. A multi-ply structure which includes a release coating sandwiched between two plies of the structure and present in an amount of about 5 to about 25 g/sq yd., one of the plies of the structure being flexible and in contact with the release coating and removable therefrom by the application of a force of between about 90 to about 600 g/in., as determined by the Keil test procedure, the flexible ply consisting essentially of fused PVC plastisol and the release coating consisting essentially of carboxylated styrene-butadiene resin, kaolin clay and magnesium hydroxide.

2. A structure according to claim 1 wherein the weight ratio of clay to magnesium hydroxide is about 2:1 to about 2.5:1.

3. A structure according to claim 1 wherein the weight ratio of clay to magnesium hydroxide is about 2.1:1 to about 2.3:1.

4. A structure according to claim 1 wherein the weight ratio of clay to magnesium hydroxide is at least about 1.5:1.

5. A structure according to claim 1 wherein the force is about 110 to about 600 g/inch.

6. A structure according to claim 5 wherein the weight ratio of clay to magnesium hydroxide is about 2:1 to about 2.5:1.

7. A structure according to claim 5 wherein the weight ratio of clay to magnesium hydroxide is about 2.1:1 to about 2.3:1.

8. A structure according to claim 5 wherein the weight ratio of clay to magnesium hydroxide is at least about 1.5:1.

9. A structure according to claim 5 wherein the amount of release coating is about 10 to about 20 g/sq yd.

10. A structure according to claim 9 wherein the weight ratio of clay to magnesium hydroxide is about 2:1 to about 2.5:1.

11. A structure according to claim 9 wherein the weight ratio of clay to magnesium hydroxide is about 2.1:1 to about 2.3:1.

12. A structure according to claim 9 wherein the weight ratio of clay to magnesium hydroxide is at least about 1.5:1.

13. A structure according to claim 12 wherein the force is about 250 to about 500 g/in.

14. A structure according to claim 13 wherein the amount of the release coating is about 10 to about 20 g/sq.yd.

15. A multi-ply structure which includes a release coating sandwiched between two plies of the structure and present in an amount of about 5 to about 25 g/sq yd., one of the plies of the structure being flexible and in contact with the release coating and removable therefrom by the application of a force of between about 90 to about 600 g/in., as determined by the Keil test procedure, wherein the release coating consists essentially of a resin binder, clay and magnesium hydroxide.

16. A structure according to claim 15 wherein the flexible ply consists essentially of fused PVC plastisol.

17. A structure according to claim 16 wherein the resin of the binder has a glass transition temperature of about $-25°$ C. to about $45°$ C.

18. A structure according to claim 16 wherein the resin is selected from the group consisting of acrylic resins, methacrylic resins and methyl cellulose.

19. A structure according to claim 15 wherein the force is about 110 to about 600 g/inch.

20. A structure according to claim 19 in which the amount of the release coating is about 10 to about 20 g/sq yd.

* * * * *